United States Patent
Johnson

(10) Patent No.: US 10,477,960 B1
(45) Date of Patent: Nov. 19, 2019

(54) RETRACTABLE DESK AND SHELF WITH MAGNETIC WALL ATTACHMENT

(71) Applicant: Reeve Johnson, Telluride, CO (US)

(72) Inventor: Reeve Johnson, Telluride, CO (US)

(73) Assignee: Reeve Johnson, Telluride, CO (US)

( * ) Notice: Subject to any disclaimer, the term of this patent is extended or adjusted under 35 U.S.C. 154(b) by 0 days.

(21) Appl. No.: 16/017,504

(22) Filed: Jun. 25, 2018

Related U.S. Application Data

(60) Provisional application No. 62/524,689, filed on Jun. 26, 2017.

(51) Int. Cl.
| | |
|---|---|
| *A47B 3/00* | (2006.01) |
| *A47B 5/06* | (2006.01) |
| *F16M 11/10* | (2006.01) |
| *A47B 21/00* | (2006.01) |
| *A47B 85/06* | (2006.01) |

(52) U.S. Cl.
CPC ............... *A47B 3/002* (2013.01); *A47B 5/06* (2013.01); *F16M 11/10* (2013.01); *A47B 21/00* (2013.01); *A47B 85/06* (2013.01); *A47B 2200/0066* (2013.01)

(58) Field of Classification Search
CPC ................................ A47B 96/02; D06F 81/06
USPC ............................ 108/42, 47, 48, 23, 25, 26
See application file for complete search history.

(56) References Cited

U.S. PATENT DOCUMENTS

| | | | | |
|---|---|---|---|---|
| 1,571,753 | A * | 2/1926 | Christian | A47B 31/06 108/47 |
| 1,963,477 | A * | 6/1934 | Stein | F21V 21/08 108/23 |
| 2,687,336 | A * | 8/1954 | Smith | B60N 3/004 108/135 |
| 2,977,082 | A * | 3/1961 | Harris | A47G 1/17 248/206.5 |
| 4,863,124 | A * | 9/1989 | Ball | A47B 21/00 108/28 |
| 5,116,011 | A * | 5/1992 | Smith | A47B 21/03 108/23 |
| 5,158,023 | A * | 10/1992 | Allen | E04G 5/00 108/42 |
| 5,526,941 | A * | 6/1996 | Ford | A47F 5/0869 211/103 |
| 5,542,360 | A * | 8/1996 | Fleming | A47B 23/04 108/23 |
| 5,695,073 | A * | 12/1997 | Klein | A47B 61/04 211/113 |
| 6,318,569 | B1 * | 11/2001 | Rothing | A47B 96/027 108/152 |
| 6,474,244 | B1 * | 11/2002 | Karpinski | E04H 4/14 108/42 |
| 7,374,052 | B2 * | 5/2008 | Price | A47F 5/00 211/103 |
| 8,245,650 | B1 * | 8/2012 | McKsymick | A47B 3/10 108/25 |
| 8,857,347 | B1 * | 10/2014 | Liu | A47B 5/02 108/47 |
| 9,683,363 | B2 * | 6/2017 | Pearson | G10K 11/16 |

(Continued)

*Primary Examiner* — Jose V Chen
(74) *Attorney, Agent, or Firm* — Staniford Tomita LLP

(57) ABSTRACT

An adjustable desk includes a planar desktop and adjustable brackets that are coupled to a vertical wall with magnets. The adjustable desk has a horizontal position where the desktop is horizontal and a retracted position where the desktop is rotated downward.

20 Claims, 11 Drawing Sheets

(56) References Cited

U.S. PATENT DOCUMENTS

| | | | |
|---|---|---|---|
| 2003/0038100 A1* | 2/2003 | Liu | B25H 3/04 |
| | | | 211/88.01 |
| 2007/0101908 A1* | 5/2007 | Makita | A47B 5/02 |
| | | | 108/47 |
| 2013/0199420 A1* | 8/2013 | Hjelm | A47B 21/00 |
| | | | 108/20 |
| 2014/0123882 A1* | 5/2014 | Kassanoff | A47B 41/00 |
| | | | 108/26 |
| 2015/0048228 A1* | 2/2015 | Mullins | A47B 5/04 |
| | | | 248/240.4 |
| 2015/0173507 A1* | 6/2015 | Cardon | A47B 23/06 |
| | | | 108/26 |
| 2016/0082584 A1* | 3/2016 | Brassette | B25H 1/04 |
| | | | 108/42 |

\* cited by examiner

RETRACTABLE DESK AND SHELF WITH MAGNETIC WALL ATTACHMENT

CROSS REFERENCE TO RELATED APPLICATION

This application claims priority to U.S. Provisional Patent Application No. 62/524,689, "Foldable Desk And Shelf With Magnetic Wall Attachment" filed Jun. 26, 2017 which is hereby incorporated by reference in its entirety.

BACKGROUND

Desks are generally stand alone structures that occupy space. In areas where space is limited, the use of desks can be problematic. What is needed is a desk that can be folded against a wall when not in use and easily removed from the wall when the desk needs to be moved or stored.

SUMMARY OF THE INVENTION

The adjustable desk and shelf was conceived as a way to provide additional, flexible workspace for spaces such as classrooms which can become busy and noisy.

The inventive desk allows students to quickly set up a workstation desk in the common room which can be a quieter location than a classroom. Thus, the inventive desks provided additional workspaces and flexible storage locations within the classroom. For example, the science teacher can use the shelf as a temporary location to store science experiment being conducted by his or her students.

The invention is a foldable shelf and desk workspace surface that is magnetically coupled to a wall. The foldable shelf and desk workspace is designed for use primarily in residential and classroom settings but can be used in any other location for any suitable purposes. Often times in the classroom, there is a need for students to find additional workspace or to allow students to work in a quieter location. Because the foldable shelf and desk workspace is portable, the student or teacher can move into a remote work location and quickly set up a work surface against a vertical wall that has at least some ferromagnetic metal materials. In an embodiment, the vertical wall can be made of ferromagnetic materials and in other embodiments, ferromagnetic materials such as metal strips with planar surfaces are rigidly and securely attached to a wall. For example, an elongated ferromagnetic bar of ferromagnetic material can have a plurality of holes so that screws and/or bolts can be used to secure the elongated ferromagnetic bar to the vertical wall. Alternatively, strong adhesives can be used to secure the elongated ferromagnetic bar to the wall.

In an embodiment, the dimensions of the shelf or the desk when fully open can have a desk top surface that is 48" wide×11.25" deep×0.75" thickness. In other embodiments, the shelf or desk surface can be any other dimension. The desk top can be supported by two brackets which can be 16" high and 11" deep. The dimensions of the bracket can also be any other dimensions that fit the shelf or desk top surface. The shelf or desk top surface can be made of materials such as a planar piece of wood and the brackets can be made of metal. The brackets can hold the planar shelf or desk top surface in a 90 degree orientation relative to the vertical wall. In different embodiments, the two brackets can also include a hinge that allows the shelf or desk top surface to rotate and collapsible downward against the wall or removed from the wall so the entire structure can be easy folded for of storage.

It is generally desirable to have the planar surface of the magnetic desk perfectly level relative to the ground. In an embodiment, the angle of the planar surface relative to the wall can be controlled with adjustable with angle adjusters coupled to the brackets. The angular adjusters control the front to back angle of the planar surface. The side to side angle can be controlled by adjusting the vertical position of one or more of the brackets that are magnetically coupled to the wall. In an alternative embodiment, the bracket can include vertical adjusters, which can allow the brackets to be moved vertically relative to the wall without altering the position of the magnets on the wall.

For example, the shelf can also function as much needed additional storage space in a classroom or other structure. As discussed, the shelf can be easily folded against the support wall. This allows for easy storage when not in use as well as an easy way to transport the shelf.

The magnetic desk can include various other additional features including: a cup holder, a level and a light.

In an embodiment, the desk may include a cup holder that can hold a beverage on a side edge of the desk. The teachers at the school who tested the shelf were eager to add a safe and out-of-the-way location for a drink. A cup holder is located on the left side of the shelf. The cup holder can both protects the workspace and provides an easy location for beverage.

In an embodiment, the magnetic desk can include a level indicator, which can be used to identify the level orientation of the desk surface. A small leveling device is located on the back edge of the shelf. This allows for a quick reference check on if your workspace is flat and optimal for working. More specifically, the level indicator can inform the user of the adjustments that need to be made. The user can make the required adjustments and then recheck the level indicator. This process can be repeated until the level indicator indicates that the desk is level.

In an embodiment, the desk can include a light that can be attached to the desk. The light can allow user to illuminate their moveable workspace. For example, a small task light can be mounted on an elevated bar off of the rear edge of the shelf. This light allows for greater flexibility in work locations.

DETAILED DESCRIPTION

Figure 1:
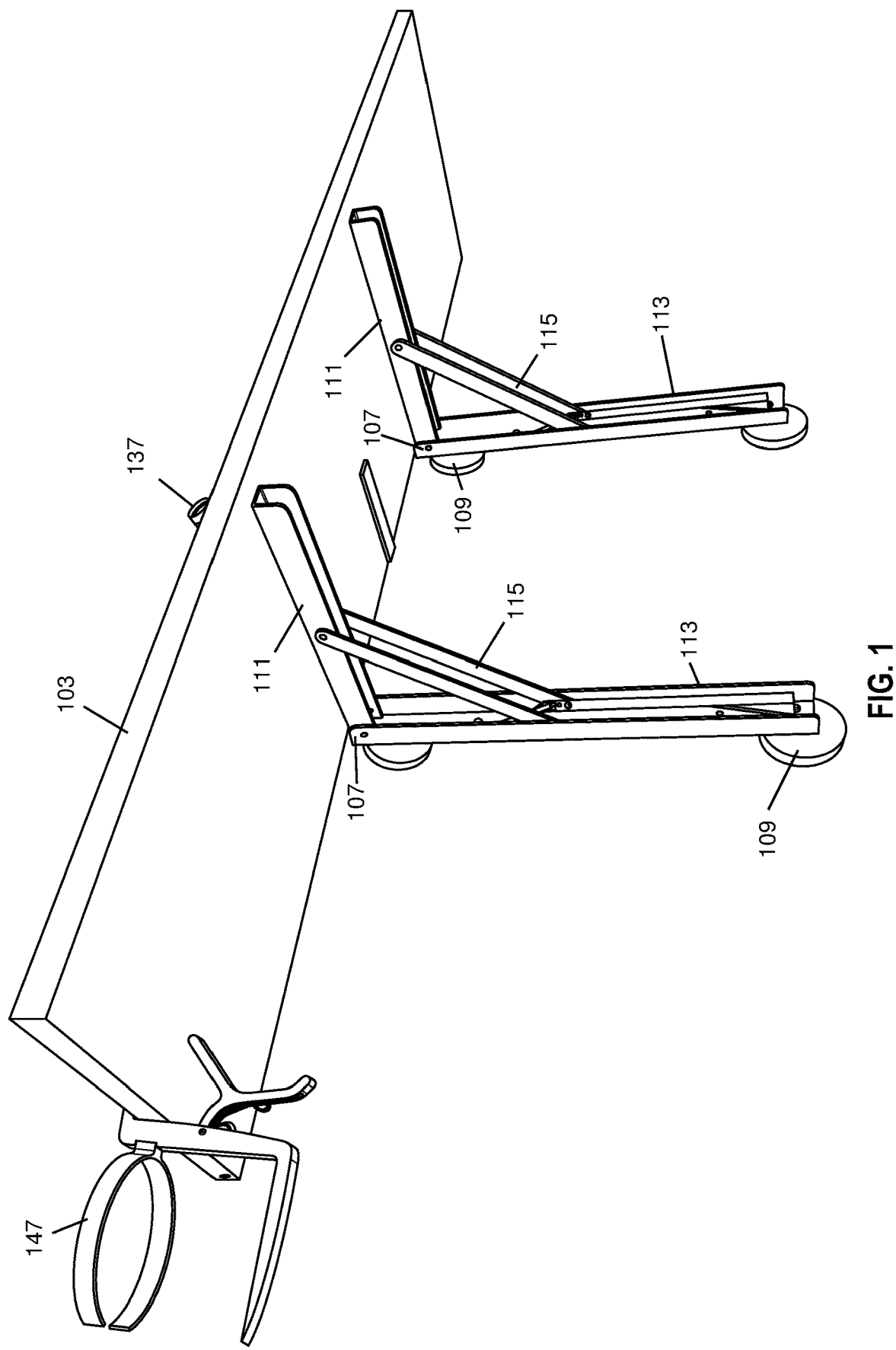
FIG. 1 illustrates a lower perspective view of an embodiment of a desk in a horizontal position.
Figure 2:
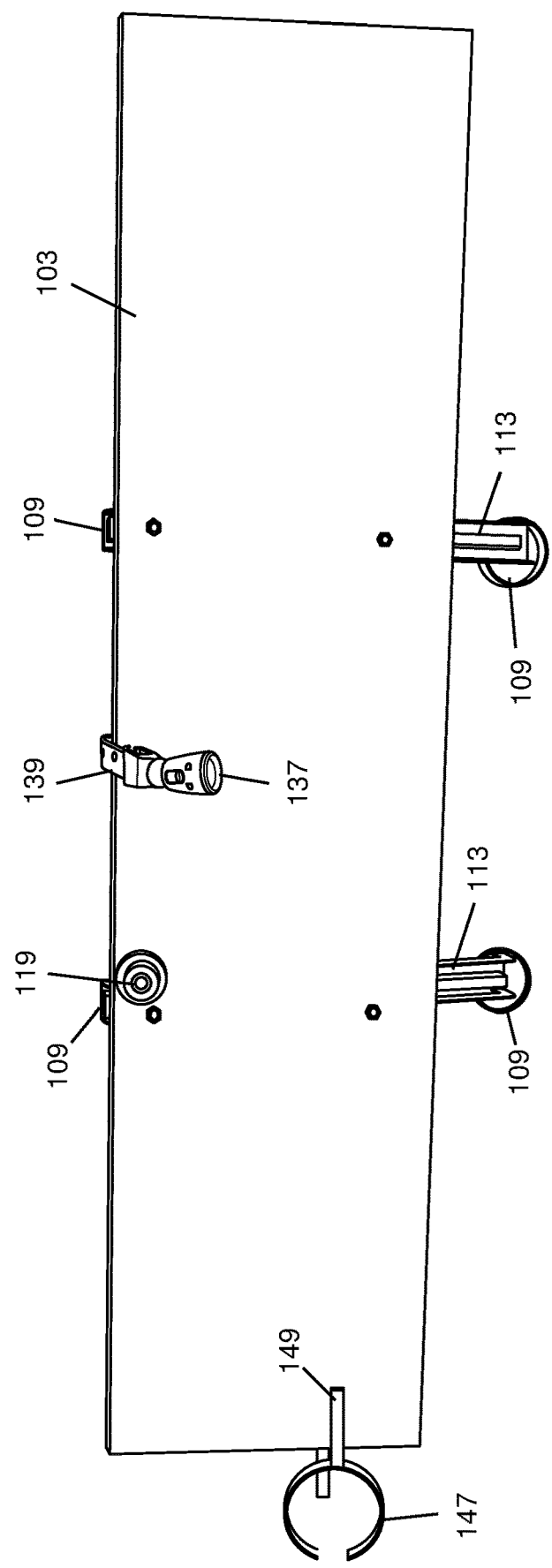
FIG. 2 illustrates a front perspective view of an embodiment of a desk in a collapsed position.
Figure 3:
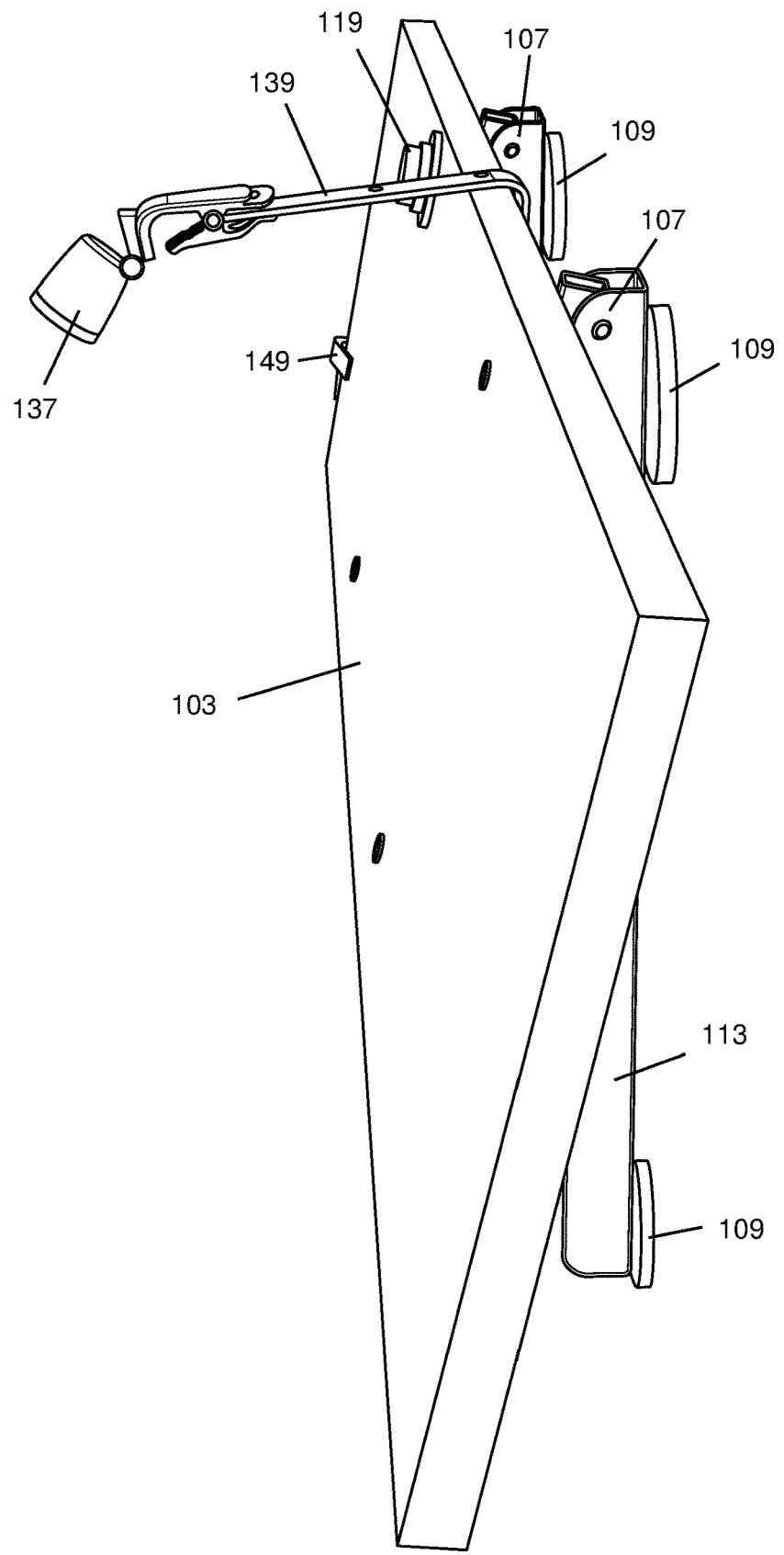
FIG. 3 illustrates a side perspective view of an embodiment of a desk in a collapsed position.

With reference to FIGS. 1-3, bottom views of a desk 101 (or shelf) with two brackets 105 is illustrated. Each of the brackets 105 includes a vertical member 113, which is adjacent to the support wall 123. Two magnets 109 are attached to opposite end portions of the vertical members 113. The magnets 109 are positioned between the vertical members 113 and the support wall 123. The magnets 109 can be coupled to threaded rods 129, which are attached threaded holes 121 on the upper and lower portions of the vertical members 113. The tops of the vertical members 113 are coupled to hinges 107, which are also coupled to horizontal rotational members 111. Support members 115 are also coupled to the vertical members 113 and horizontal members 111. In this example, the support members 115 are diagonal members that support the horizontal members 111 and the desktop 103 in a horizontal position. The support members 115 are adjustable between an extended and retracted positions that allow the horizontal members 111 and the desktop 103 to rotate downward.

In the embodiment, the inventive desk 101 includes two folding brackets 105 with four magnetics 109 that secure the desk 101 to the wall 123. In other embodiments, the desk 101 can be supported by just the two upper magnets 109 which can allow for additional hanging flexibility. Each of the magnets 109 can be rated to hold 65 pounds or more. Thus, a force of 65 pounds or more is required to pull each of the magnets away from the wall 123. In an embodiment, the wall 123 contact surface with the magnets 109 can be abrasive to resist sliding against the wall contact surface. The force required to slide each of the magnets 109 against the wall 123 can be represented by the equation $F_{slide} = F_{magnetc} \times C_F$ (Friction Coefficient). If the $C_F$ is greater than 1, the force required to slide each of the magnets 109 in a planar movement against the wall 123 will be greater than 65 pounds. Conversely, if the $C_F$ is less than 1, the force required to slide each of the magnets 109 in a planar movement against the wall 123 will be less than 65 pounds.

With a bracket length of 16 inches and a width of 11.25 inches and two 65 pound magnets on the upper ends of the brackets, the desk can support a torque force of 2×65 lbs.×1.25 feet (16 inches)=162.5 pound feet about the lower end of the bracket. This torque resistance can resist a force of F=162.5 pound feet/0.9375 feet (11.25 inches)=173 pounds at the front edge of the desk. While these magnetic equations are based on 65 lbs. magnets, in other embodiments any other magnetic strength magnets can be used.

FIGS. 1 and 2 illustrate a beverage container holder 147 attached to a side of the desk surface 103. In the illustrated embodiment, the beverage container holder 147 includes a circular hoop and a lower support. The beverage container holder 147 also includes a clamp mechanism 149, which engages the upper and lower sides of the desk surface 103.

With reference to FIG. 2, a level gage 119 is attached to the upper surface of the desk 103. In this embodiment, the level gage 119 is an air bubble in a circular liquid filled structure. The desk surface 103 is perfectly level when the air bubble is in a center circle of the level gage 119. The level of the desk can be adjusted by rotating the threaded bolts or other adjustment mechanisms coupled to the magnets 109.

Figure 7:
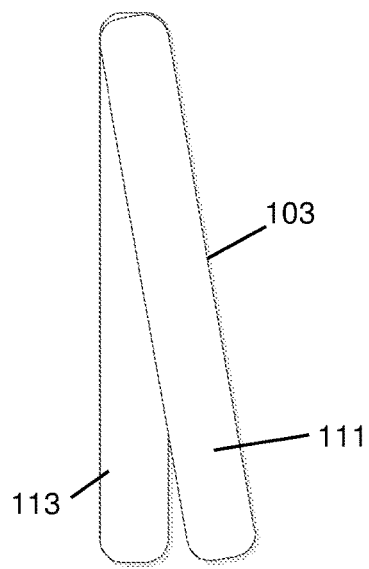
FIG. 7 illustrates a side view of an embodiment of a desk in a retracted position.

With reference to FIGS. 2 and 3, in an embodiment a light structure has a bracket 139 can be attached to the desk 103 and a light 137. An electrical power source can be coupled to the light 137, which can illuminate the desk 103. With reference to FIG. 7, the brackets have been collapsed so that the desk is folded down. The cup holder, level and light are secured to the desk and remain attached to the desk in the folded position.

Figure 4:
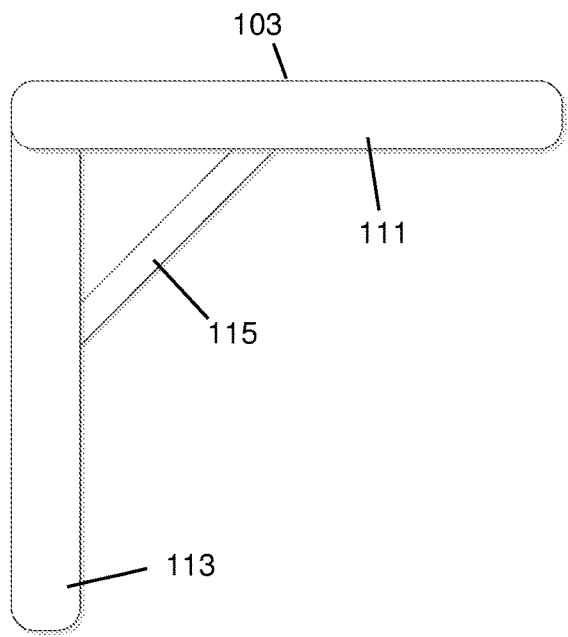
FIG. 4 illustrates a side view of an embodiment of a desk in a horizontal position.
Figure 5:
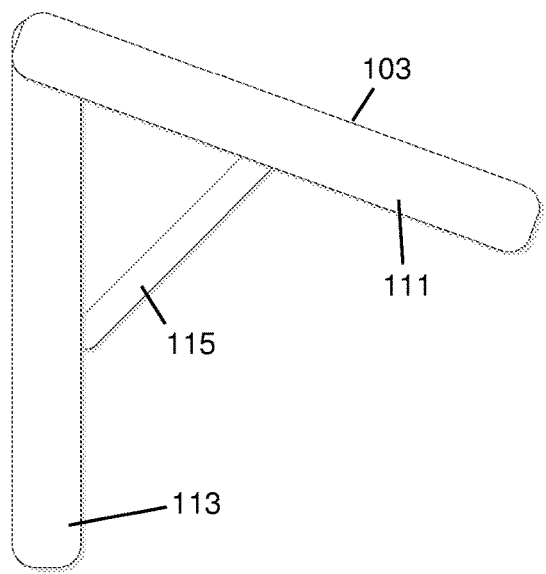
FIGS. 5 and 6 illustrate side views of an embodiment of a desk in partially retracted position.
Figure 6:
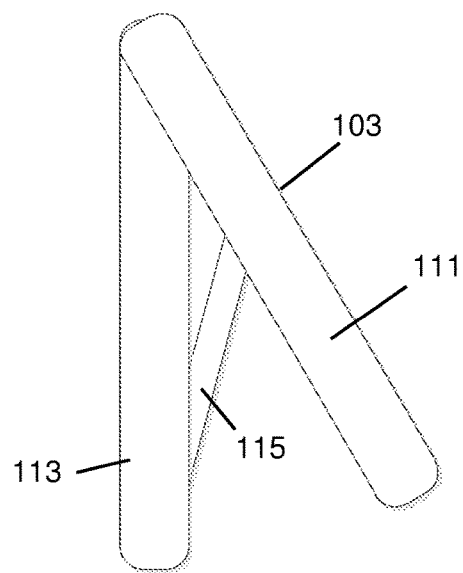

With reference to FIGS. 4-7, side view drawings of the desk support bracket are illustrated. In FIG. 4, the vertical member 113 and the horizontal member 111 are 90 degrees from each other. The support member 115 is in a diagonal locked position to support the horizontal member 111. In the illustrated embodiment, the diagonal support member 115 has a hinged connection to the horizontal member 111 and a moveable connection to the vertical member 113. With reference to FIGS. 5-7, when the support member 115 is released to slide against the vertical member 113, the desktop 103 can be collapsed. With reference to FIG. 5, the lower end of the diagonal support member 115 slides down the vertical member 113 as the horizontal member 111 rotates downward. With reference to FIG. 6, the lower end of the support member 115 slides further down the vertical member 113 as the horizontal member 111 continues to rotate downward. With reference to FIG. 7, the lower end of the support member 115 slides further down the vertical member 113 when the horizontal member 111 and desktop 103 are fully moved to the folded position.

Figure 8:
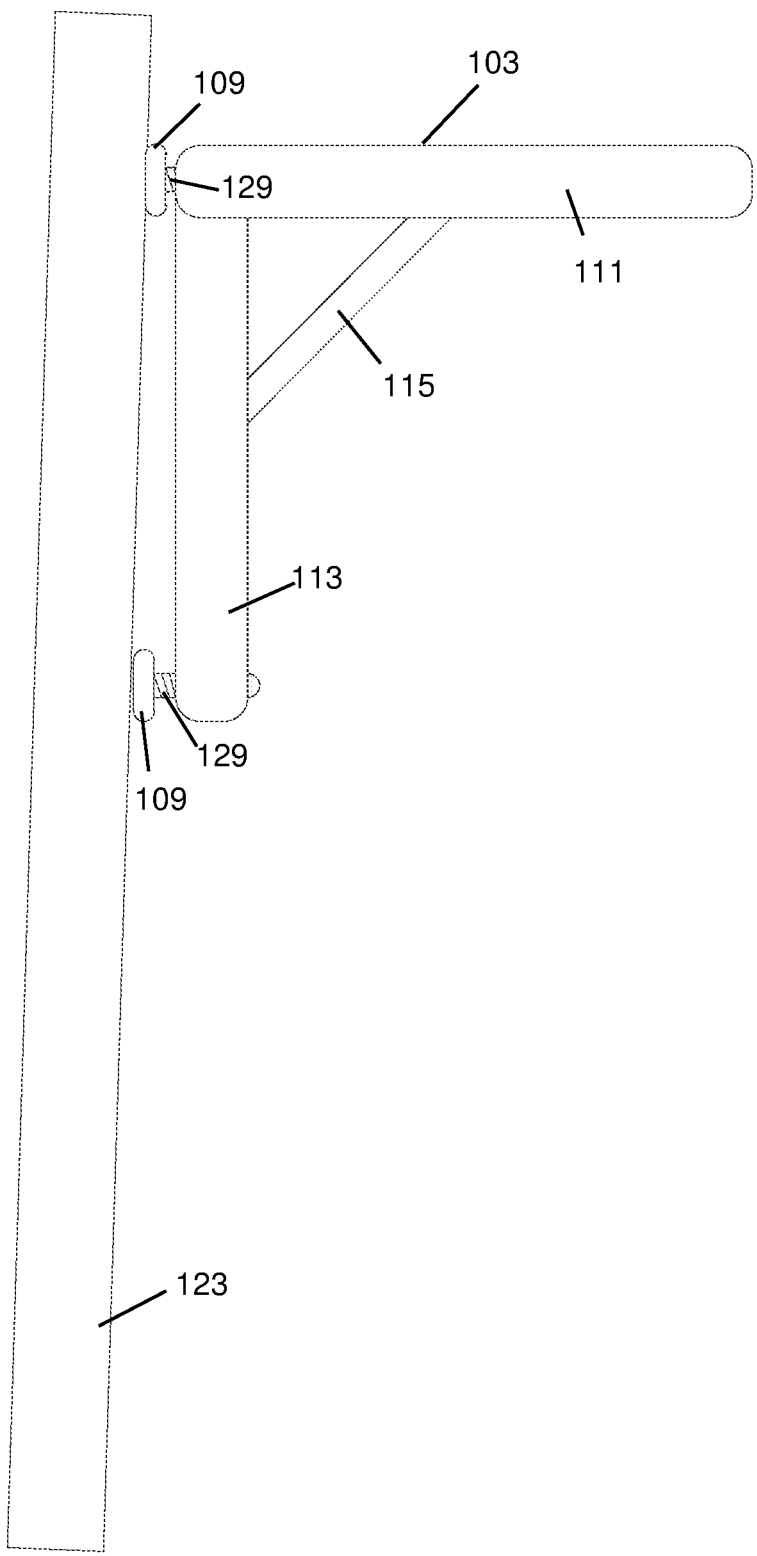
FIGS. 8-10 illustrate side view of embodiments of a desk in a horizontal position with magnetic position adjusters.

In an embodiment with reference to FIG. 8, the brackets can include adjusters 129, which allow the desk top 103 surface to be leveled even if the wall 123 is not perfectly vertical. In the illustrated embodiment, the wall 123 is angled inward towards the open space in the room. The magnets 109 on the lower portion of the vertical members 113 of the brackets have been adjusted to move the lower portions of the vertical members 113 further away from the wall 123 than the upper portions of the vertical members 113, so the vertical member 123 is vertically aligned. The adjusters 129 can be threaded rods which can be rotated within threaded holes in the vertical member 123. By rotating the threaded rod adjusters 129, the positions of the magnets 109 can be adjusted relative to the vertical members 113. In an embodiment, the ends of the threaded rod adjusters 129 can have a recessed tool feature such as a slot, slots, hex recess, torx recess, or external feature that can allow a tool to engage and rotate the threaded rod adjusters 129.

In another embodiment, the vertical member 113 can be attached to the wall 123 so that it is not perfectly vertical. In this embodiment, the diagonal support members 115 can be adjusted so the horizontal members 111 and desktop 103 are level and the angle between the vertical members 109 and horizontal members 111 is greater than 90 degrees.

Figure 9:
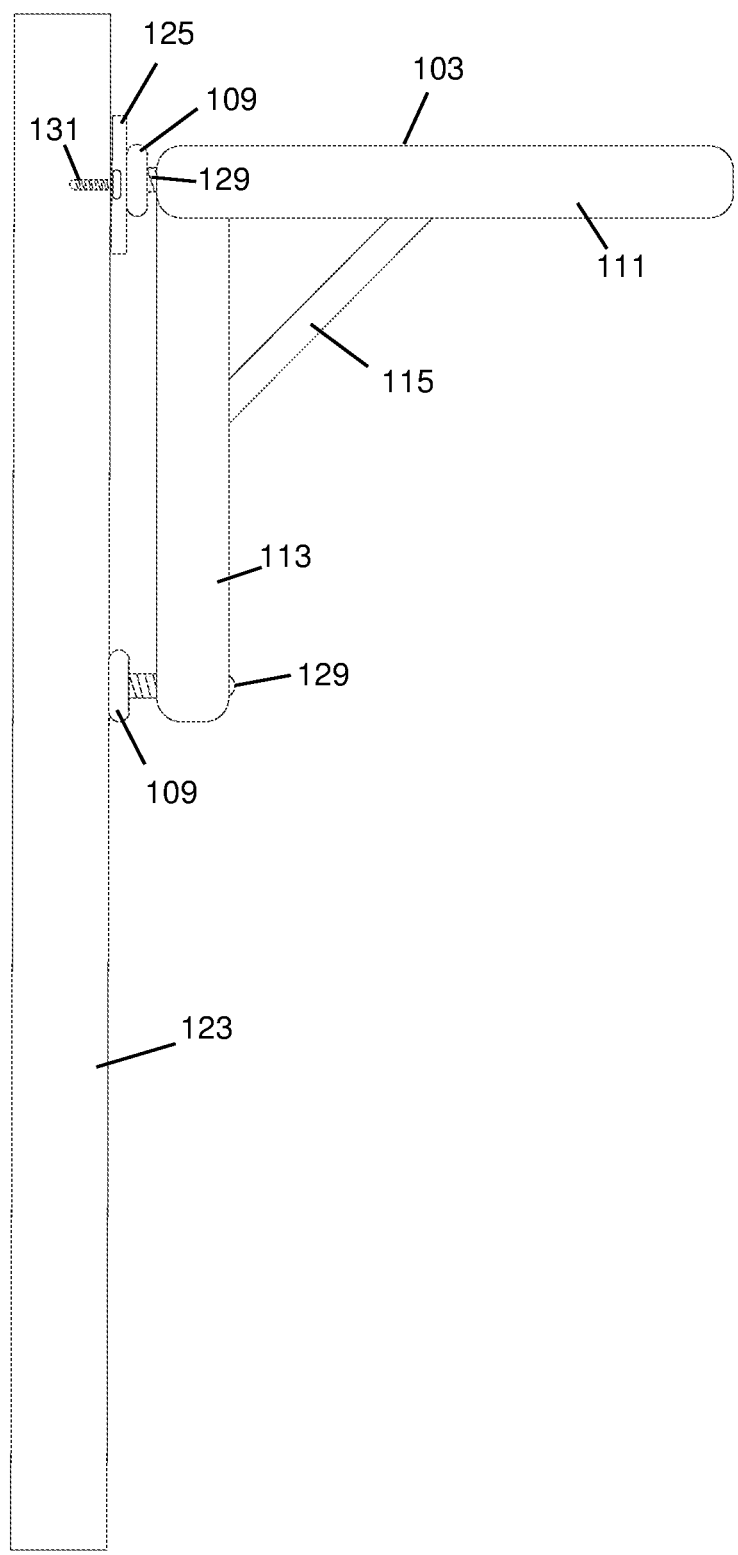

With reference to FIG. 9, many walls 123 are not made of metal and do not include a magnetic material. In order to use the desk, a metal bar 125 can be screwed to the wall 123 with fasteners 131 such as screws placed through holes in the metal bar 125. The upper magnets 109 can then be magnetically attached to the metal bar 125. In the illustrated embodiment, the upper magnets 109 have been screwed further into the vertical member 109 of the brackets than the lower magnets 109 so that the desktop 103 will be level. In an embodiment, the lower magnets 109 are not necessary and can be replaced with pads which will not damage the contact surface of the wall 123.

Figure 10:
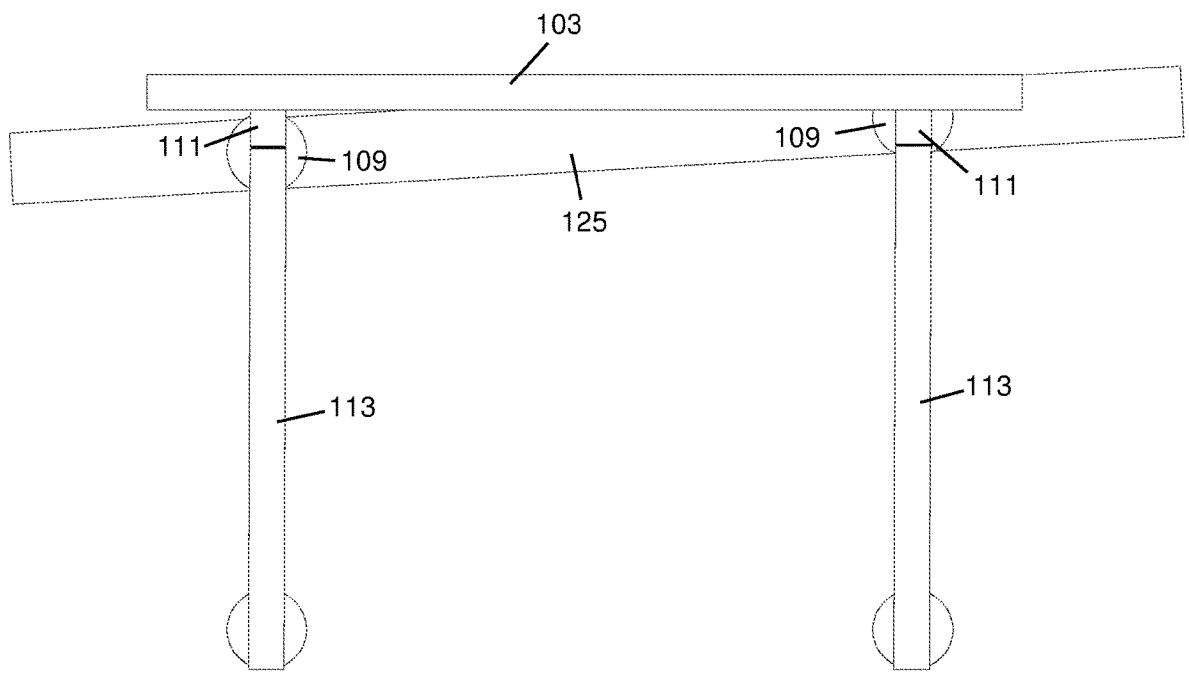

With reference to FIG. 10, it can be important to level the desk top 103 from side to side if the metal bar 125 is not level. In the illustrated example, the metal bar 125 is attached to the wall at an angle. In order to compensate for the angular error, the upper magnets 109 can be adjusted vertically on the vertical members 113 of the brackets. In an embodiment, the vertical members 113 can have multiple threaded holes and the upper magnets 109 of the left vertical member 113 bracket can be placed in a lower hole than the right vertical member 113 bracket.

Figure 11:
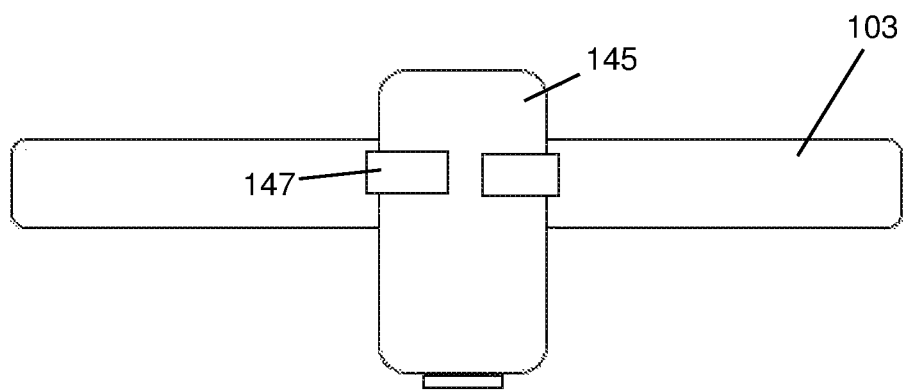
FIGS. 11 and 12 illustrate side view of an embodiment of a beverage container holder attached to a desk.
Figure 12:
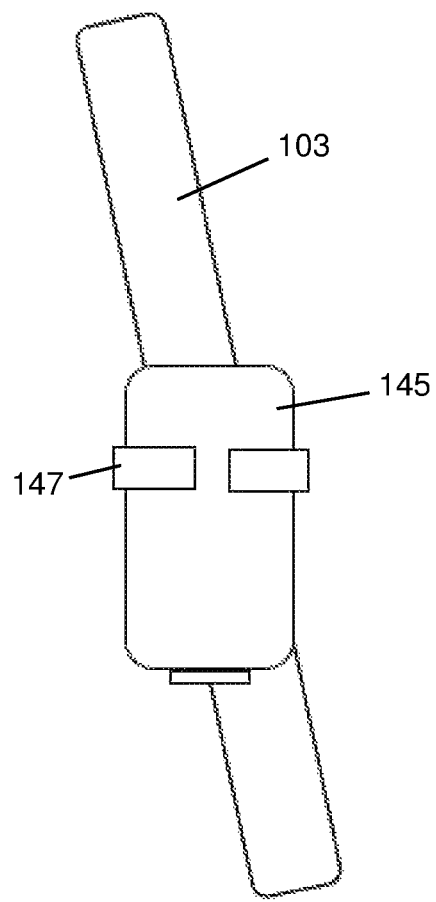
Figure 13:
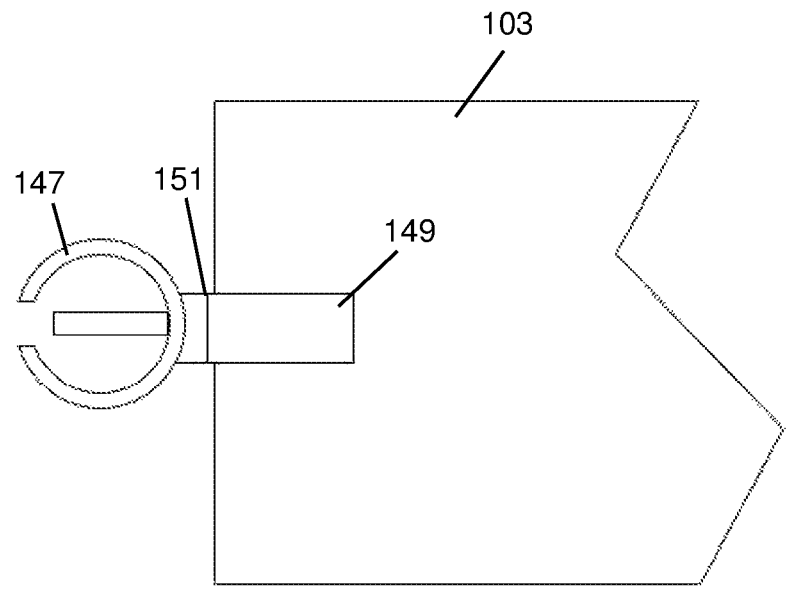
FIG. 13 illustrates a top view of an embodiment of a beverage container holder attached to a desk in a horizontal position.
Figure 14:
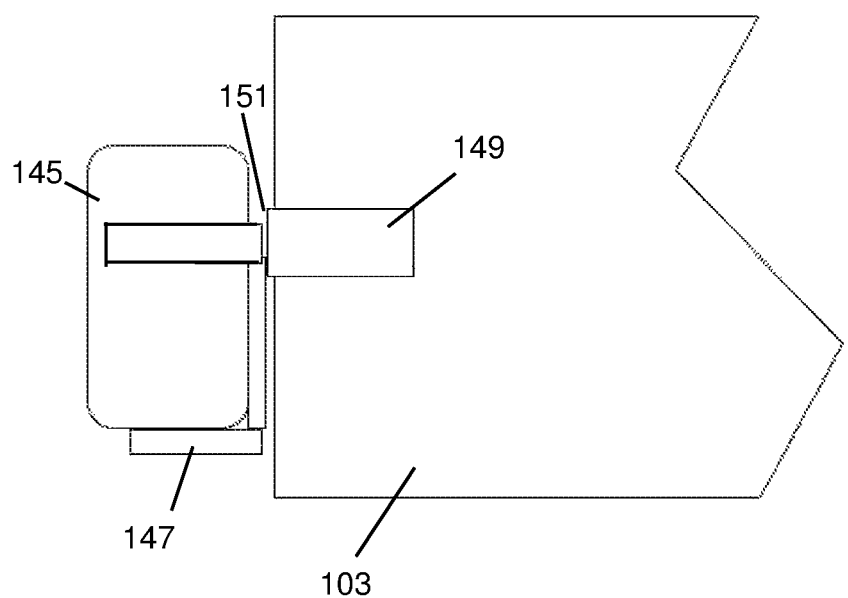
FIG. 14 illustrates a front view of an embodiment of a beverage container holder attached to a desk in a retracted position.

In an embodiment, the light, beverage container holder and other attachments can be mounted on gimbal mechanisms which can keep the attachments in an upright orientation. With reference to FIG. 11, a beverage container holder 147 coupled to a horizontal desk surface 103. The beverage container holder 147 has a rotational coupling that always holds a beverage container 145 upright. With reference to FIG. 12, when the desk 103 is rotated down, the beverage container holder 147 rotates to keep the beverage container 145 upright. The axis of rotation of the beverage container holder 147 is parallel to the axis of rotation of the desk surface 103. With reference to FIG. 13, a top view of the beverage container holder 147 coupled to a horizontal desk surface 103 is illustrated. With reference to FIG. 14, a front view of the beverage container holder 147 coupled to a desk surface 103 in the rotated down position is illustrated. The axis of rotation of the rotational member 151 is parallel with the rotational edge of the desk 103 and aligned with the width of the desk 103. The center of gravity of the beverage container holder 147 is lower than the axis of rotation of the rotational member 151 so the beverage container holder 147 will always be in an upright vertical orientation.

Figure 15:
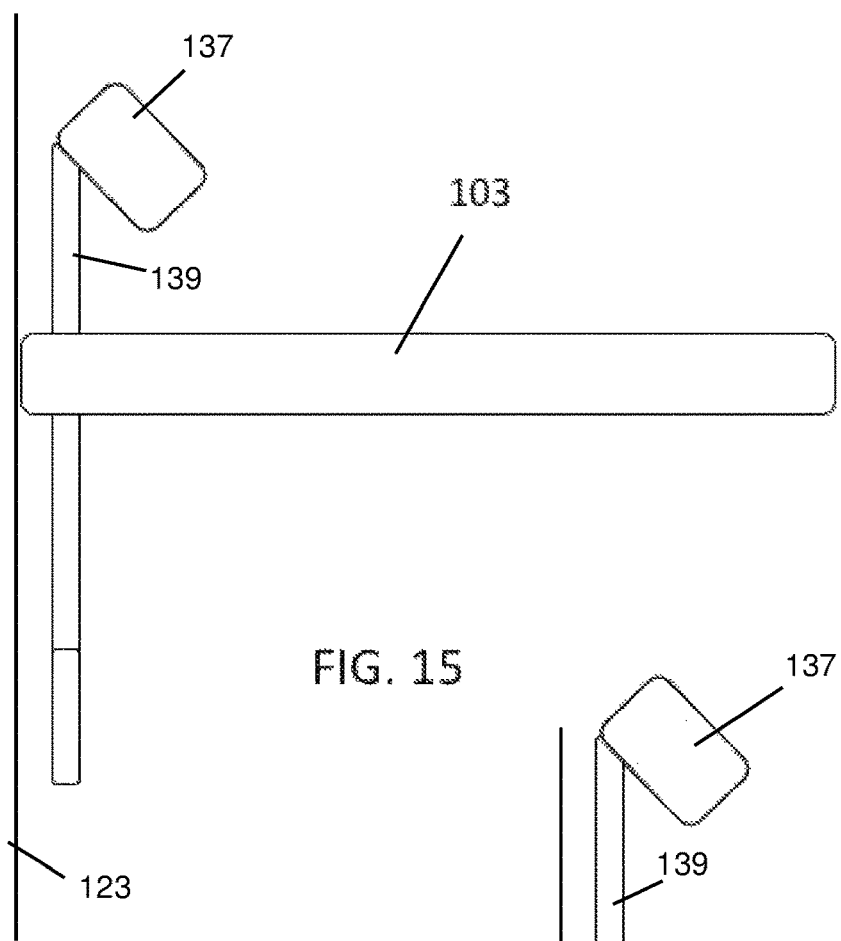
FIG. 15 illustrates a side view of an embodiment of a light attached to a desk in a horizontal position.
Figure 17:
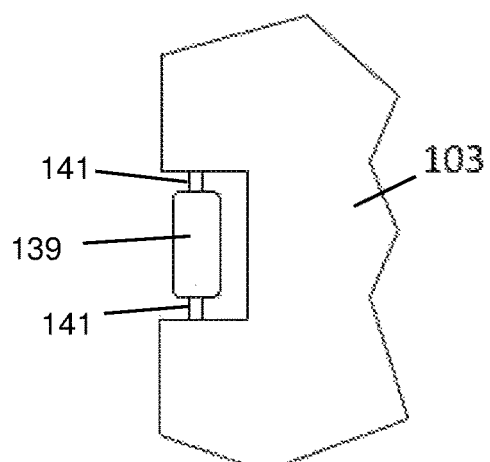
FIG. 17 illustrates a top view of a rotating light attachment coupled to the desk.
Figure 16:
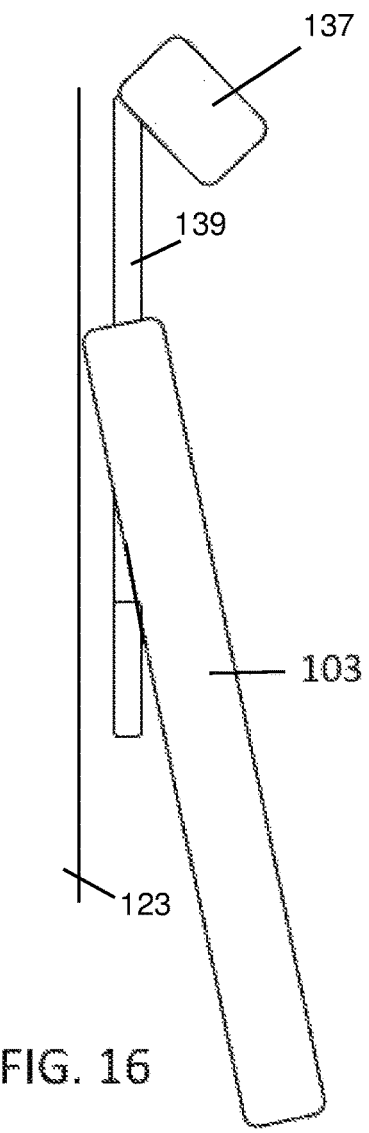
FIG. 16 illustrates a side view of an embodiment of a light attached to a desk in a retracted position.
Figure 18:
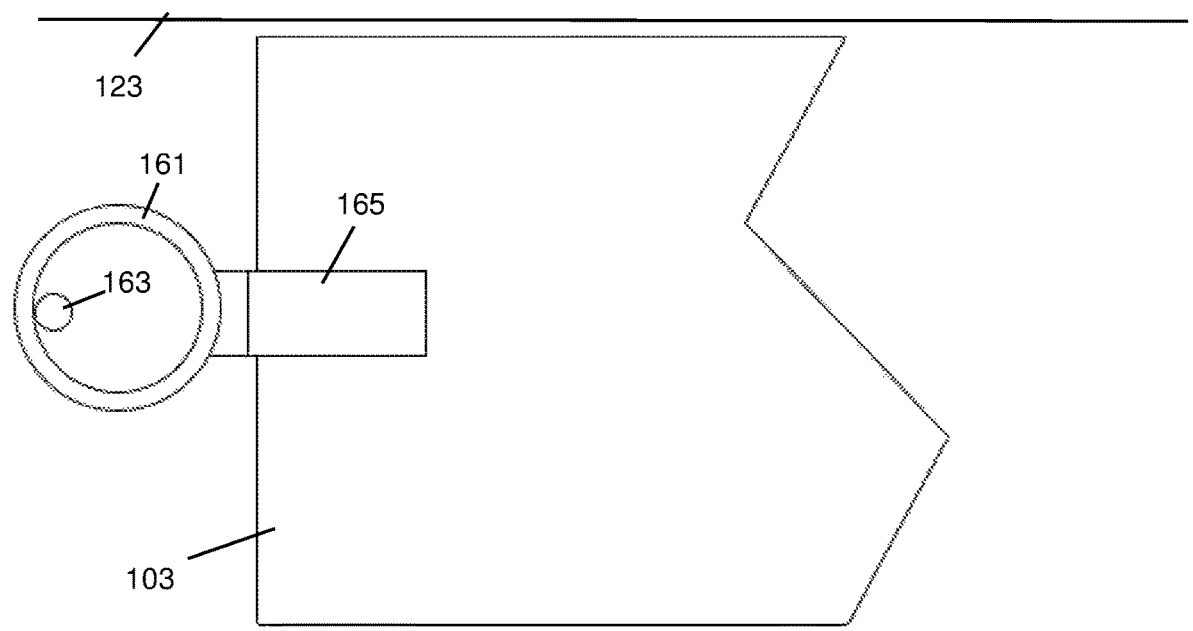
FIG. 18 illustrates a top view of a rotating pencil holder coupled to a horizontal desk surface.
Figure 19:
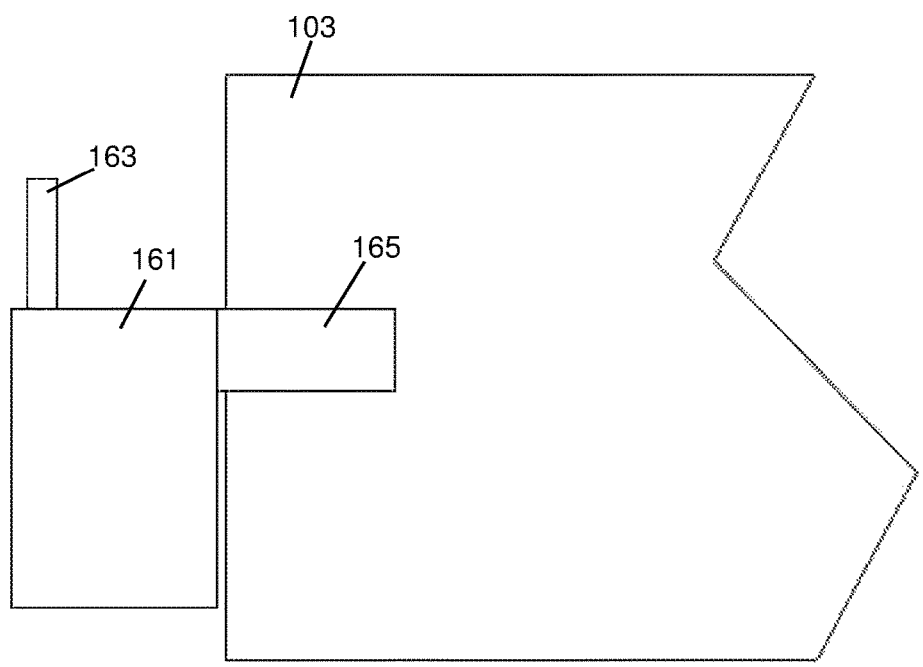
FIG. 19 illustrates a front view of a rotating pencil holder coupled to a vertical desk surface.

With reference to FIGS. 15-17, in an embodiment, the light 137 can be mounted on bracket 139 coupled to a hinge which can allow the light to be in a vertical orientation regardless of the position of the desk top 103. This can be beneficial since the light 137 can direct light away from the wall 123 either onto the desk top 103 or into the room when the desk top 103 is down. With reference to FIGS. 15 and 16, the light bracket 139 can be elongated and extend below the edge of the desk top 103 against the wall 123. With reference to FIG. 17, the light bracket 139 can be coupled to the desk top 103 with a hinge 141 so that the desk top 103 can rotate while the light bracket 139 can remain in a vertical orientation. In other embodiments, the lower portion of the bracket 139 below the hinge 141 can be heavier than the upper portion of the bracket 139 and the light 137 so the light bracket 139 will remain in a vertical orientation. With reference to FIGS. 18 and 19, a pencil 163 in a pencil holder 161 coupled to a desk top 103 is illustrated. The pencil holder 161 can be attached to the desk top 103 with a rotational attachment 165. As discussed above, the axis of rotation of the rotational attachment 165 is parallel to the axis of rotation of the desk surface 103. With reference to FIG. 18, a top view of the pencil holder 161 coupled to a horizontal desk surface 103 is illustrated. With reference to FIG. 19, a front view of the desk surface 103 in the rotated down position is illustrated with a connected pencil holder 161 which remains in the upright position. The axis of rotation of the rotational member 151 is parallel with the rotational edge of the desk 103 and aligned with the width of the desk 103. The center of gravity of the pencil holder 161 is lower than the axis of rotation of the rotational attachment 165 to the pencil holder 161 will always be in an upright vertical orientation.

It will be understood that the inventive system has been described with reference to particular embodiments, however additions, deletions and changes could be made to these embodiments without departing from the scope of the inventive system. Although the systems that have been described include various components, it is well understood that these components and the described configuration can be modified and rearranged in various other configurations.

What is claimed is:

1. An adjustable desk comprising:
a first bracket having a first rotational elongated member, a first non-rotational elongated member, a first magnet coupled to the first non-rotational elongated vertical member, and a first hinge coupled to an inner end of the first rotational elongated member, an upper end of the first non-rotational elongated vertical member, and a first support member coupled between the first rotational elongated member and the first non-rotational elongated vertical member;
a second bracket having a second rotational elongated member, a second non-rotational elongated vertical member, a second magnet coupled to the second non-rotational elongated vertical member, a second hinge coupled to an inner end of the second rotational elongated member and an upper end of the second non-rotational elongated vertical member, and a second support member coupled between the second rotational elongated member and the second non-rotational elongated vertical member; and
a planar desktop rigidly coupled to the first rotational elongated member and the second rotational elongated member;
wherein the first magnet holds the first non-rotational elongated vertical member against a vertical wall, the second magnet holds the second non-rotational elongated vertical member against the vertical wall, the first support member and the second support member have an extended position which holds the desktop and the first rotational elongated member and the second rotational elongated member in a horizontal position and the first support member and the second support member have a retracted position where the desktop and the first rotational elongated member and the second rotational elongated member in a downward rotated position and a slide force ($F_{slide}$)=a magnetic force ($F_{magnetic}$)×a coefficient of friction ($C_F$) of the first magnet and the second magnet against the metal bar supports the weight of the first bracket, the second bracket, and the planar desktop.

2. The adjustable desk of claim 1 further comprising:
a first adjuster coupled between the first magnet and the first non-rotational elongated vertical member wherein the first adjuster controls the orientation of the first elongated vertical members; and
a second adjuster coupled between the second plurality of magnets and the second non-rotational elongated vertical member wherein the second adjuster control the orientation of the second elongated vertical members.

3. The adjustable desk of claim 2 wherein the first adjuster and the second adjuster include threaded rods.

4. The adjustable desk of claim 3 wherein the first non-rotational elongated vertical member and the second non-rotational elongated vertical member each have a plurality of holes that extend along the lengths of the first non-rotational elongated vertical member and the second non-rotational elongated vertical member.

5. The adjustable desk of claim 1 further comprising:
an elongated light bracket having a proximal portion and a distal portion;
a bracket coupling for securing the elongated light bracket to the desktop; and
a light coupled to the distal end of the elongated light bracket;
wherein the light bracket is perpendicular to a plane of the desktop.

6. The adjustable desk of claim 5 wherein the bracket coupling includes a rotational coupling that has an axis of rotation that is horizontal and parallel with the vertical wall and the center of gravity of the elongated light rod is lower than the axis of rotation of the rotational coupling so the elongated light rod is vertically oriented when the desktop is in both the horizontal position and the retracted position.

7. The adjustable desk of claim 1 further comprising:
a level gage coupled to an upper surface of the desktop.

8. The adjustable desk of claim 1 further comprising:
a cup holder; and
a rotational coupling the cup holder to a side edge of the desktop wherein the rotational coupling has an axis of rotation that is horizontal and parallel with the vertical wall and the cup holder is vertically oriented when the desktop is in both the horizontal position and the retracted position.

9. The adjustable desk of claim 1 further comprising:
a pencil holder; and
a rotational coupling the pencil holder to a side edge of the desktop wherein the rotational coupling has an axis of rotation that is perpendicular with the side edge of the desktop and parallel with the vertical wall and the cup holder is vertically oriented when the desktop is in both the horizontal position and the retracted position.

10. The adjustable desk of claim 1 further comprising:
a planar metal surface attached to the vertical wall wherein the first magnet and the second magnet are magnetically attached to the planar metal surface.

11. An adjustable desk comprising:
a metal bar having a planar surface attached to a vertical wall with a plurality of fasteners;
a first bracket having a first rotational elongated member, a first non-rotational elongated member, a first magnet coupled to the first non-rotational elongated vertical member, and a first hinge coupled to an inner end of the first rotational elongated member, an upper end of the first non-rotational elongated vertical member, and a first bracket locking mechanism coupled between the first rotational elongated member and the first non-rotational elongated vertical member;
a second bracket having a second rotational elongated member, a second non-rotational elongated vertical member, a second magnet coupled to the second non-rotational elongated vertical member, a second hinge coupled to an inner end of the second rotational elongated member and an upper end of the second non-rotational elongated vertical member, and a second bracket locking mechanism coupled between the second rotational elongated member and the second non-rotational elongated vertical member; and
a planar desktop rigidly coupled to the first rotational elongated member and the second rotational elongated member;
wherein the first magnet holds the first non-rotational elongated vertical member against the metal bar on the vertical wall, the second magnet holds the second non-rotational elongated vertical member against the metal bar on the vertical wall, the first locking mechanism and the second locking mechanism have an extended position which holds the desktop and the first rotational elongated member and the second rotational elongated member in a horizontal position and the first locking mechanism and the second locking mechanism have a retracted position where the desktop and the first rotational elongated member and the second rotational elongated member in a downward rotated position and a slide force ($F_{slide}$)=a magnetic force ($F_{magnetic}$)×a coefficient of friction ($C_F$) of the first magnet and the second magnet against the metal bar supports the weight of the first bracket, the second bracket, and the planar desktop.

12. The adjustable desk of claim 11 further comprising:
a first adjuster coupled between the first magnet and the first non-rotational elongated vertical member wherein the first adjuster controls the angular orientation of the first elongated vertical members; and
a second adjuster coupled between the second plurality of magnets and the second non-rotational elongated vertical member wherein the second adjuster controls the angular orientation of the second elongated vertical members.

13. The adjustable desk of claim 12 wherein the first adjuster and the second adjuster include threaded rods.

14. The adjustable desk of claim 13 wherein the first non-rotational elongated vertical member and the second non-rotational elongated vertical member each have a plurality of holes that extend along the lengths of the first non-rotational elongated vertical member and the second non-rotational elongated vertical member.

15. The adjustable desk of claim 11 further comprising:
an elongated light rod having a proximal portion and a distal portion;
a rod coupling for securing the elongated light rod to the desktop; and
a light coupled to the distal end of the elongated light rod;
wherein the light rod is perpendicular to a plane of the desktop when the desktop is horizontal.

16. The adjustable desk of claim 15 wherein the bracket coupling includes a rotational coupling that has an axis of rotation that is horizontal and parallel with the vertical wall and the center of gravity of the elongated light rod is lower than the axis of rotation of the rotational coupling so the elongated light rod is vertically oriented when the desktop is in both the horizontal position and the retracted position.

17. The adjustable desk of claim 11 further comprising:
a level gage coupled to an upper surface of the desktop.

18. The adjustable desk of claim 11 further comprising:
a cup holder; and
a rotational coupling the cup holder to a side edge of the desktop wherein the rotational coupling has an axis of rotation that is horizontal and parallel with the vertical wall and the cup holder is vertically oriented when the desktop is in both the horizontal position and the retracted position.

19. The adjustable desk of claim 11 further comprising:
a pencil holder; and
a rotational coupling the pencil holder to a side edge of the desktop wherein the rotational coupling has an axis of rotation that is perpendicular with the side edge of the desktop and parallel with the vertical wall and the cup holder is vertically oriented when the desktop is in both the horizontal position and the retracted position.

20. The adjustable desk of claim 11 further comprising:
a third magnet coupled to the first non-rotational elongated vertical member; and
a fourth magnet coupled to the second non-rotational elongated vertical member.

\* \* \* \* \*